United States Patent
Eki et al.

[11] Patent Number: 5,860,044
[45] Date of Patent: Jan. 12, 1999

[54] OPEN/CLOSE MECHANISM OF UPPER FRAME FOR USE IN IMAGE FORMING APPARATUS

[75] Inventors: Makoto Eki; Masayuki Mizuno; Susumu Taniguchi; Hideaki Kimata; Keiji Ban; Hiroyuki Arima; Katsuhide Yamaguchi, all of Osaka, Japan

[73] Assignee: Mita Industrial Co., Ltd., Osaka-fu, Japan

[21] Appl. No.: 966,505

[22] Filed: Nov. 10, 1997

[30] Foreign Application Priority Data

Nov. 15, 1919 [JP] Japan ..................................... 8-304956

[51] Int. Cl.$^6$ ........................... G03G 15/00; G03G 21/16
[52] U.S. Cl. ................................................. 399/125
[58] Field of Search ..................................... 399/107, 110, 399/125; 16/82, 83; 188/266, 272, 135, 139

[56] References Cited

U.S. PATENT DOCUMENTS

| 4,386,841 | 6/1983 | Wakao et al. | 399/125 |
| 4,589,758 | 5/1986 | Kasama et al. | 399/125 X |
| 4,641,947 | 2/1987 | Ishida et al. | 399/125 |
| 5,041,871 | 8/1991 | Hata | 399/325 |
| 5,206,681 | 4/1993 | Otomo et al. | 399/125 X |
| 5,379,092 | 1/1995 | Takashima | 399/125 |

Primary Examiner—Sandra Brase
Attorney, Agent, or Firm—Jordan and Hamburg

[57] ABSTRACT

This invention relates to an image forming apparatus constructed such that an upper frame is openably mounted on a main base frame and a pivotal movement transmitter (gear) is rotatably mounted on the upper frame about an axis of a rotation of the upper frame, i.e., in association with the rotation of the upper frame. The gear has a cam portion. One end of a lever comes into contact with part of the cam portion of the gear, while the opposite end of the lever comes into contact with a coil spring. Further, a distance from the pivotal axis of the gear to the contact position of the lever with the cam portion decreases in accordance with a proceeding of the closing operation. Accordingly, as the lever (cam follower) follows the cam portion in accordance with the closing operation of the upper frame, a compression force to compress the coil spring increases. Thereby, a brake force applied to the upper frame on the way of closing also increases.

10 Claims, 7 Drawing Sheets

OPEN/CLOSE MECHANISM OF UPPER FRAME FOR USE IN IMAGE FORMING APPARATUS

BACKGROUND OF THE INVENTION

1. Field of the Invention

This invention relates to an open/close mechanism of an upper frame for use in an image forming apparatus such as a copying machine, a facsimile machine, a printer, and a compound machine having combined functions of these machines. The image forming apparatus comprises a main base frame, the upper frame rotatably linked to an upper end of the main base frame to open and close relative to the main base frame by a rotation of the upper frame about a pivotal axis of the upper end, and a brake force apply mechanism for applying a brake force to the upper frame.

2. Description of the Background Art

There has been known an image forming apparatus of a so-called shell type in which an upper frame is openably connected to a main base frame. In such shell type image forming apparatus, an operating unit provided with ten key switches and a start button, and an upper cover are arranged on the upper frame to constitute an upper unit, while the main base frame is internally provided with various elements such as an imaging unit and a recording paper transport unit.

An operator can easily access the inside of the image forming apparatus (i.e., inside of the main base frame) by opening the upper unit (upper frame) relative to the main base frame to remove recording paper jammed inside the apparatus or to replenish toner. Upon completion of the certain operation such as removal of jammed paper and toner replenishment, the operator closes the upper unit to restore the image forming apparatus in an initial state ready for image recording/reading operations.

Since the above image forming apparatus is constructed such that the upper unit closes the main base frame by its own weight, a well-known brake force supplier such as a gear damper and a torque limiter is provided in the apparatus to give a certain brake force to the upper unit that is being closed. The brake force supplier is adapted to reduce the closing speed of the upper unit.

The image forming apparatus provided with the above brake force supplier has suffered from the following problem. Since the brake force given to the upper unit (upper frame) is set to a constant value, it was difficult to control the closing speed of the upper unit stage by stage during a whole period from start of the closing operation to completion of the closing operation.

Observing the closing speed of the upper unit, the closing speed is relatively slow immediately after start of the closing operation. However, as the closing operation proceeds, the closing speed is accelerated. That is, the closing speed is not constant throughout the closing process.

If the brake force to be applied to the upper frame is set at a relatively low level, it is impossible to suppress the closing speed at a sufficiently low level immediately before the upper unit completely closes the main base frame (i.e., at the final stage of the closing operation) to avoid an impact force exerted on the main base frame.

On the contrary, if the brake force is set at a relatively high level, the closing operation of the upper unit at the initial stage becomes rather difficult unless an operator exerts a moderately large force at the start of closing operation.

SUMMARY OF THE INVENTION

In view of the above drawbacks of the prior art, an object of this invention is to provide an open/close mechanism of an upper frame for an image forming apparatus that enables minute control of a closing speed of the upper frame by changing a brake force applied to the upper frame in accordance with a proceeding of the closing operation.

Another object of this invention is to provide an image forming apparatus with the above open/close mechanism.

To accomplish the above objects, this invention is directed to an open/close mechanism of an upper frame for use in an image forming apparatus comprising: a main base frame, the upper frame rotatably connected to an upper end of the main base frame; and a brake force apply mechanism for applying a brake force to the upper frame during the closing operation thereof. The brake force apply mechanism includes a variable brake force apply mechanism for increasing the brake force applied to the upper frame in a certain region from start to completion of the closing operation.

This invention is further directed to an image forming apparatus comprising: a main base frame; an upper frame rotatably connected to an upper end of the main base frame, and a variable brake force apply mechanism for increasing a brake force applied to the upper frame in a certain region from start to completion of the closing operation.

The above and other objects, features and advantages of the present invention will become more apparent upon a reading of the following detailed description and drawings.

DETAILED DESCRIPTION OF THE PREFERRED EMBODIMENTS OF THE INVENTION

Hereinafter, an arrangement of various parts constituting an image forming apparatus incorporated with an open/close mechanism of this invention is briefly described first, and then, the open/close mechanism of an upper frame for use in the image forming apparatus in detail.

Figure 1:
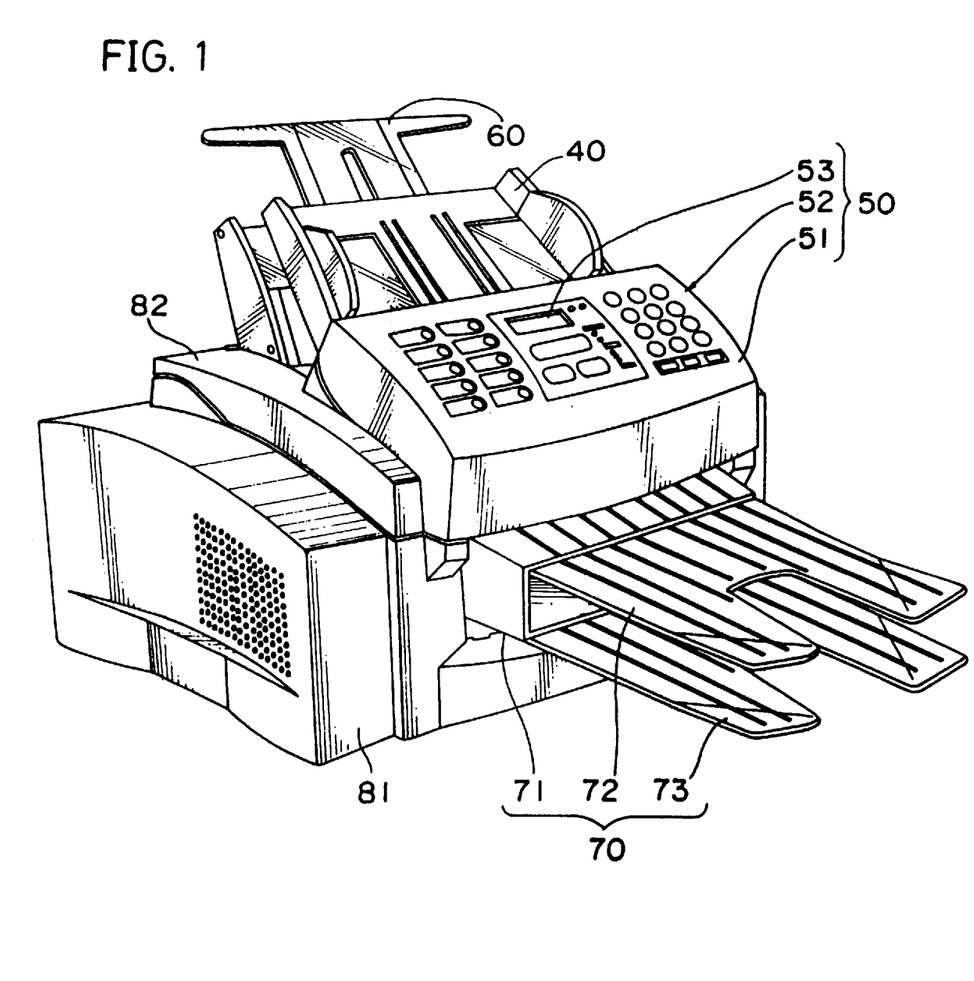
FIG. 1 is a perspective view of an external appearance of an embodiment of an image forming apparatus incorporated with an open/close mechanism of this invention.
Figure 2:
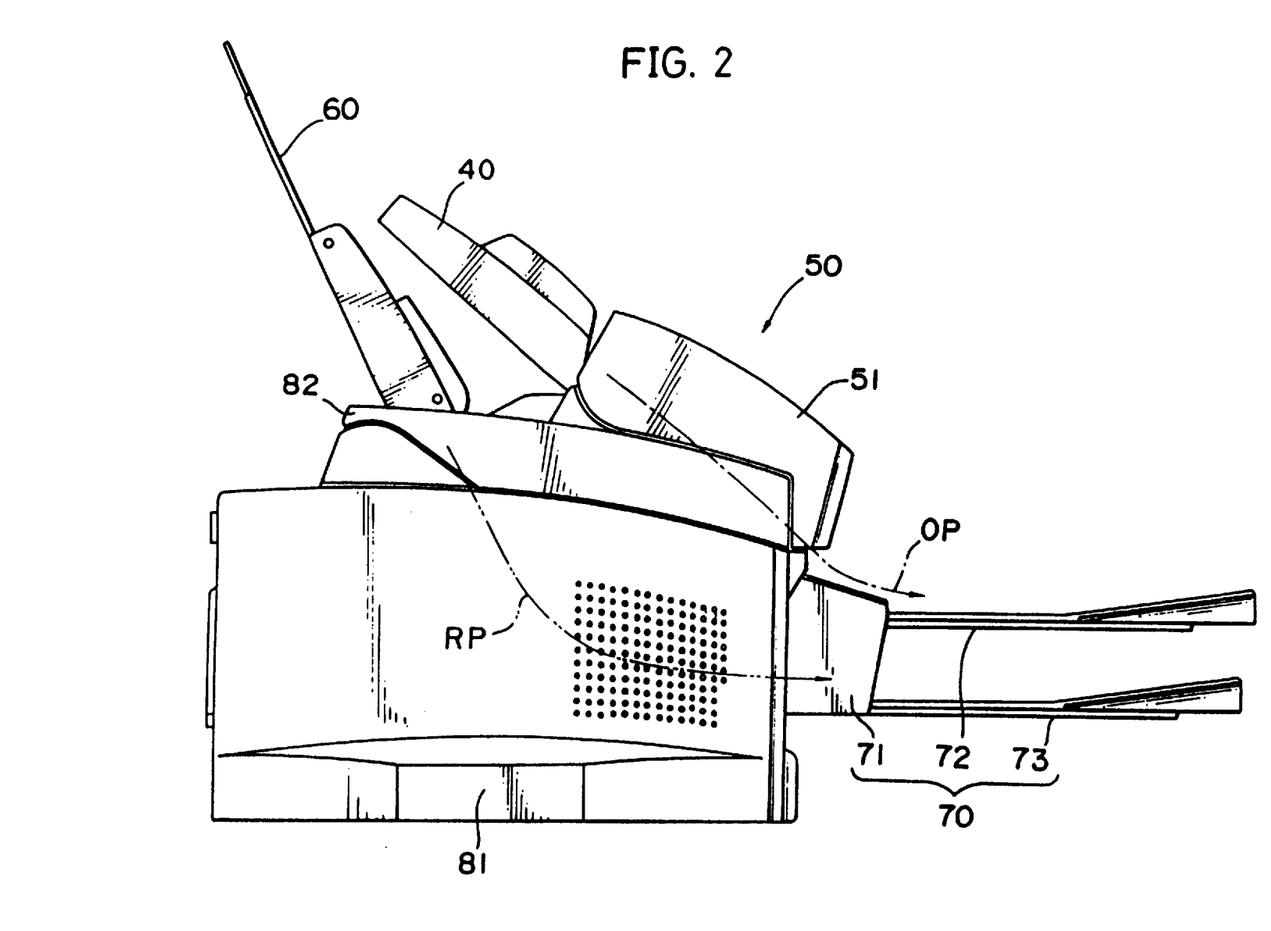
FIG. 2 is a side view of the image forming apparatus.

FIG. 1 is a perspective view of an external appearance of the image forming apparatus incorporated with the open/close mechanism embodying this invention, and FIG. 2 is a side view of the apparatus. The image forming apparatus in this embodiment is a compound machine having functions as a facsimile machine and a copying machine.

Figure 3:
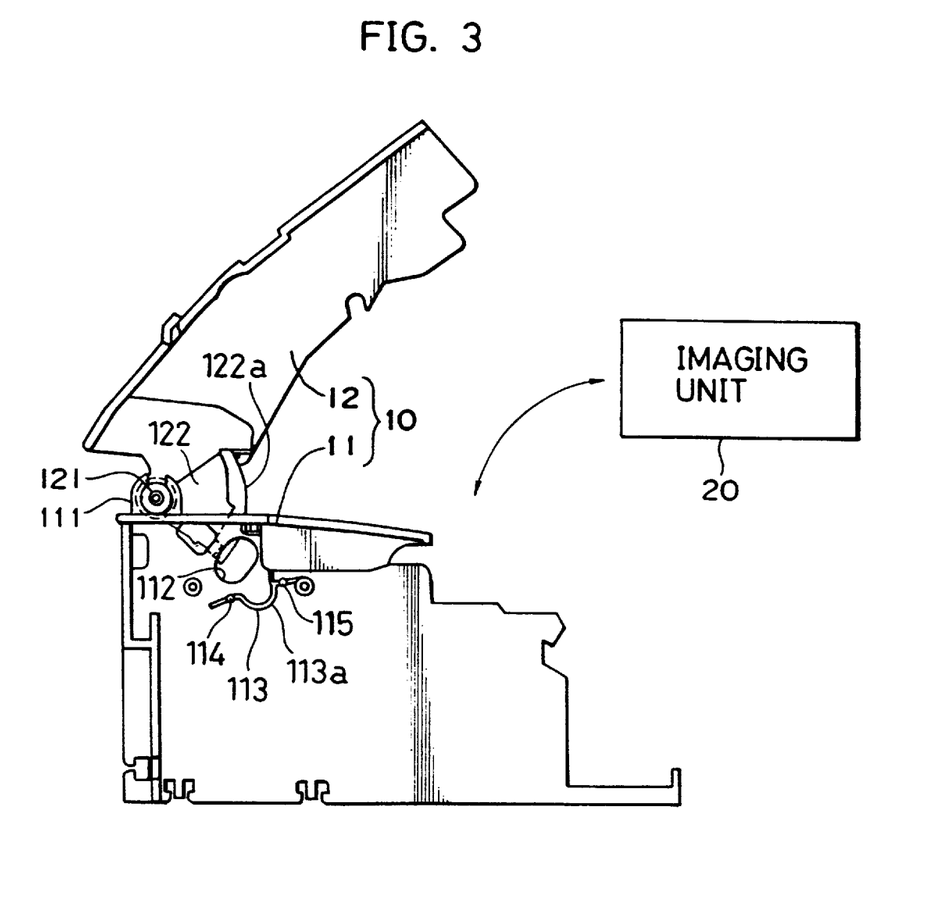
FIG. 3 is a side view of a frame structure of the image forming apparatus.

As shown in FIG. 3, the image forming apparatus has a frame body 10 consisting of a main base frame 11 located on the lower portion and an upper frame 12 located on the upper portion of the apparatus. The frame body 10 is provided with a pair of bearing portions 111 on the main base frame 11, at lateral ends (orthogonal on the plane in FIG. 3) on the rear side (left side in FIG. 3) of the apparatus. The bearing portions 111 are oriented upward (only one bearing portion is shown in FIG. 3). A shaft 121 extending in a direction orthogonal to the plane in FIG. 3 is inserted in the bearing portions 111 and 111 to render the upper frame 12 pivotable about an axis thereof.

More specifically, the apparatus in this embodiment is of a so-called shell type such that the upper frame 12 swings around the axis of the shaft 121 to open and close relative to the main base frame 11. The shell type apparatus is constructed such that an operator can accommodate an imaging unit 20 with a photoreceptor inside the main base frame 11 or take out the accommodated imaging unit 20 through an opening defined on the upper front side (upper right side in FIG. 3) of the apparatus by opening up the upper frame 12. Further, this arrangement makes it easier to remove jammed recording paper inside the apparatus.

The imaging unit 20 has a conventional arrangement except that it is detachably mounted inside the main base frame 11. Specifically, as will be described later, an image read by a contact type image scanner 33 or an image transmitted from a facsimile machine (external device) is exposed on the photoreceptor to form an electrostatic latent image, which in turn is developed into a toner image by a developing unit provided along a periphery of the photoreceptor. Then, the toner image is transferred by a transfer roller onto recording paper (cut sheet) transported from a recording paper insertion tray which is to be described later.

Figure 4:
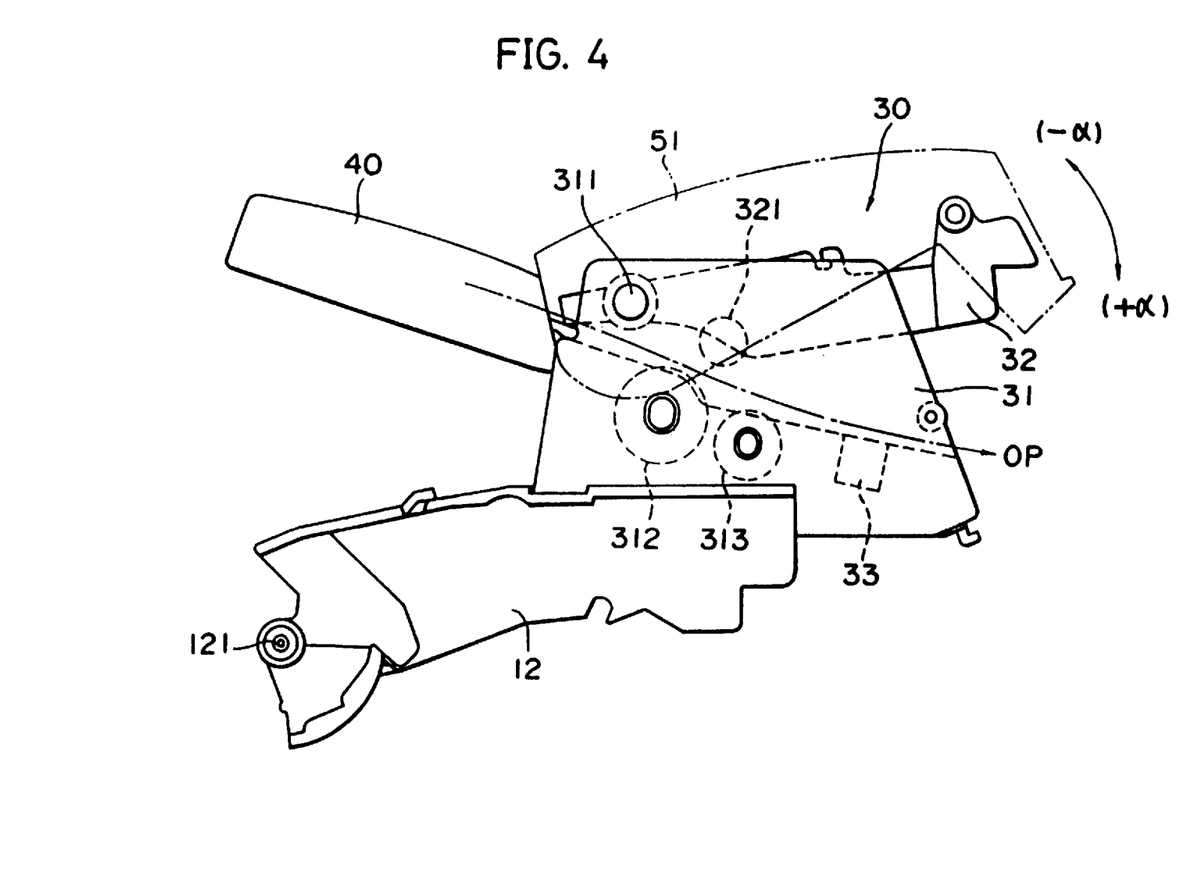
FIG. 4 is a side view showing essential parts of the image forming apparatus in a state where an automatic document feeder unit is mounted on an upper frame of the apparatus.

As shown in FIG. 4, an automatic document feeder unit 30 is mounted on the upper frame 12. The automatic document feeder unit 30 is operated to automatically feed a stack of original documents placed thereon one by one while causing the contact type image scanner 33 to successively read an image of the original documents.

The automatic document feeder unit 30 has a housing member 31 which is directly mounted on the upper frame 12 to feed documents, and a document feed guide member (hereinafter also merely referred to as "guide member") 32 which is connected to an end portion 311 provided on the rear end (left side in FIG. 4) of the housing member 31 and is pivotable around an axis of the end portion 311 in the direction of (−α) and (+α).

Generally, the guide member 32 swings in the (+α) direction by its own weight to the housing member 31 in close contact state. In this state, when document feed rollers 312 and 313 disposed on the upper side of the housing member 31, and a document feed roller 321 disposed on the lower side of the guide member 32 are rotated, a stack of original documents set on a document insertion tray 40 are fed one by one in a state that each document is nipped between the rollers 321 and 312, and the rollers 321 and 313. Thus, the documents are fed one by one toward the front side (right side in FIG. 4) of the apparatus along an original document feed path OP shown by chain line with one dot in FIG. 4.

In this embodiment, the document feed rollers 312, 313, and 321 are all driven to rotate. Alternatively, at least one of these rollers 312, 313, and 321 may be driven, while the other two rollers are allowed to be rotated by the rotation of the drive roller to thereby feed the documents.

The contact type image sensor 33 is mounted on the upper front side of the housing member 31. The image sensor 33 extends in a direction perpendicular to the plane of FIG. 4, and reads the image of a document fed by the document feeder unit 30 line after line. When the document passes the image sensor 33, the entire image of the document is read.

Referring back to FIGS. 1 and 2, in this embodiment, an operation cover 51 is provided to cover the automatic document feeder unit 30 from above. On the upper surface of the operation cover 51, there are arranged various switches 52 such as ten key switches and a start button, and a display portion 53 for displaying the telephone number for facsimile transmission/receiving and the operating status of the apparatus. The operation cover 51, the switches 52, and the display portion 53 constitute the operation unit 50.

With this arrangement, an operator performs facsimile and copying operation by pressing buttons of the operation unit 50 according to needs, and also confirms the operating status through contents displayed on the display portion 53.

Referring to FIG. 3, on the rear side of the upper frame 12, there is arranged a recording paper insertion tray 60 for setting a stack of recording paper (cut sheets). A stack of recording paper set on the recording paper insertion tray 60 are transported one by one along a recording paper transport path RP shown by chain line with two dots in FIG. 2. Specifically, recording paper is transported inside the apparatus along the transport path RP, has an image recorded on the recording paper by the imaging unit 20 based on an image read by the image scanner 33 or based on an image data transmitted from the external device, and then is discharged toward the front side of the apparatus.

In this way, the original documents after the image reading and the recording paper after the image recording are discharged toward the front side of the apparatus and received onto a tray unit 70 which is attached to the front side of the main base frame 11.

As shown in FIG. 2, the tray unit 70 includes a tray frame 71 detachably attached to the main base frame 11, and trays 72 and 73 both of which are detachably inserted in the tray frame 71 and are vertically spaced apart by a certain distance. In this embodiment, the upper tray 72 is used as a document discharge tray for discharging original documents, while the lower tray 73 is used as a recording paper discharge tray for discharging recording paper.

Covers 81 and 82 are attached to the frame body 10 from outside to protect the internal parts of the apparatus.

Figure 5:
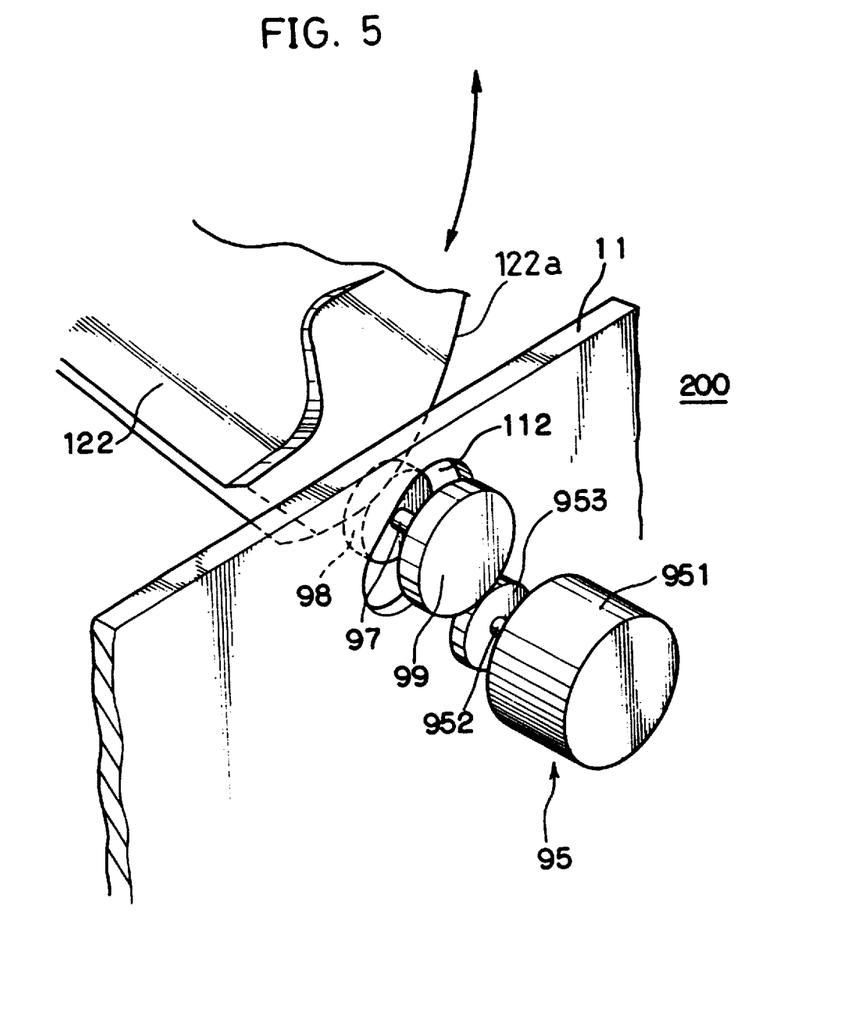
FIG. 5 is a perspective view of a constant brake force apply mechanism.
Figure 6:
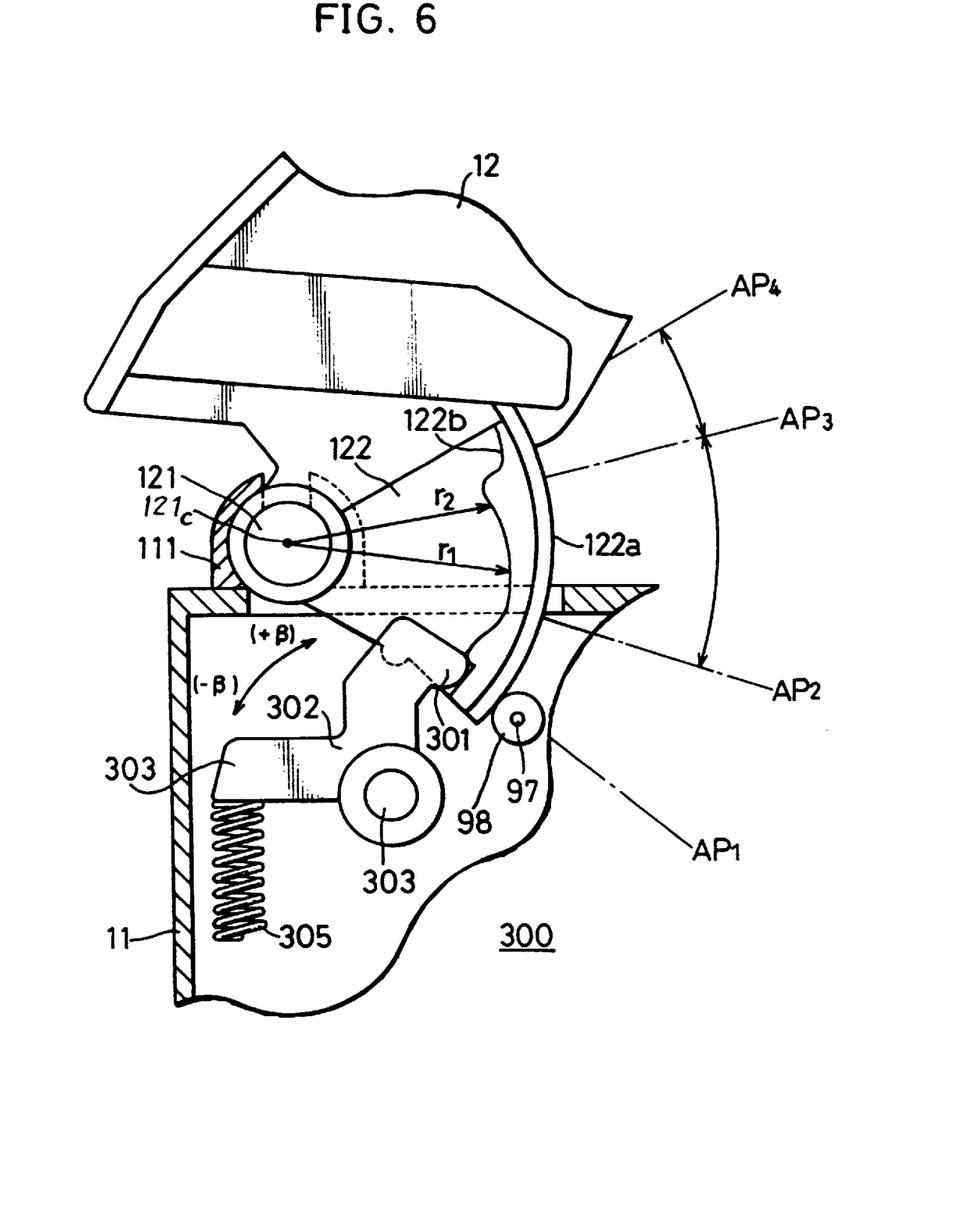
FIG. 6 is a diagram of a variable brake force apply mechanism.

Next, the open/close mechanism of the upper frame for use in the image forming apparatus is described with reference to FIGS. 3, 5, and 6. FIG. 5 is a perspective view of a constant brake force apply mechanism, and FIG. 6 is a diagram of a variable brake force apply mechanism.

As shown in FIG. 3, the upper frame 12 is provided with a fan-like gear (pivotal movement transmitter) 122 that is rotatable about the pivotal axis of the shaft 121. Specifically, the gear 122 rotates inside of the main base frame 11 in association with the opening/closing of the upper frame 12 about the pivotal axis of the shaft 121.

A side wall of the main base frame 11 is formed with a through hole 112 showing part of a tooth portion 122a formed along a circumference of the gear 122. A U-shaped mounting member (or receiving member) 113 is arranged on the lower right side in FIG. 3 of the through hole 112 in the apparatus, to mount a brake force supplier 95 (see FIG. 5) such as a gear damper and a torque limiter. More specifically, the mounting member 113 has an arc portion 113a projecting laterally outwardly from the base frame 11 in the middle thereof, and a pair of fixing pins 114 and 115 at opposite ends of the arc portion 113a. The pins 114 and 115 project outward by a certain length to enable stable mounting of the brake force supplier 95 at an appropriate position.

As shown in FIG. 5, the brake force supplier 95 comprises a main body 951 for generating a brake force, a shaft 952, and a driven gear 953 linked to the main body 951 via the shaft 952. The driven gear 953 is mounted on the outside of the main base frame 11 such that the driven gear 953 opposes to the main base frame 11 and is positioned by the fixing pins 114 and 115 (see FIG. 3). It should be noted that the illustration as to how the brake force supplier 95 is positioned relative to the base frame 11 and mounted thereon is omitted in the drawing of FIG. 5. However it should be understood that it is a common knowledge of those with skill in this field to securely fix the brake force supplier 95 with the pair of fixing pins 114, 115 by possibly having a pair of flange portions extending from the main body 951 having fixing holes whose pitch is equal to the pitch of the pair of pins 114, 115.

In this embodiment, the image forming apparatus is designed such that a rotation of the gear 122 provided on the upper frame side is transmitted to the driven gear 953 of the brake force supplier 95 via a pair of idle gears 98 and 99 that are concentrically mounted on a common shaft 97.

More specifically, the idle gear 98 is mounted on the shaft 97 that passes the through hole 112 of the main base frame 11, on the inside of the main base frame 11 (upper left side in FIG. 5), and meshes with the tooth portion 122a of the gear 122. The idle gear 99 is mounted on the shaft 97, on the outside of the main base frame 11 (lower right side in FIG. 5), and meshes with the driven gear 953.

With this arrangement, when the upper frame 12 carrying the automatic document feeder unit 30 is being rotated to close the main base frame 11, a brake force of a constant value is continuously applied to the upper frame 12. Accordingly, there can be eliminated a possibility that a large mechanical impact force generates when the upper frame 12 comes into contact with the main base frame 11 at the final stage of closing the main base frame 11.

In this way, according to this embodiment, the brake force supplier 95, the shaft 97, the pair of idle gears 98 and 99, and the pivotal movement transmitter (gear) 122 constitute a constant brake force apply mechanism 200 to keep applying a constant brake force to the upper frame 12 during a period from start of the closing operation to completion of the closing operation.

In combination with the constant brake force apply mechanism 200, a variable brake force apply mechanism 300 as constructed in the following manner (see FIG. 6) is provided in the image forming apparatus. Specifically, in the variable brake force apply mechanism 300, a cam portion 122b is formed on the inner circumferential portion of the gear 122 along the tooth portion 122a. As shown in FIG. 6, the cam portion 122b has an irregular wavelike shape in side view.

The position AP1 corresponds to a start point of closing the upper frame 12, and the position AP4 corresponds to an end point of closing the upper frame 12. First, at the position AP1, the cam portion 122b has a stepped portion and a peak. The cam portion 122b from the position AP1 to the position AP2 forms a downward slope, resulting in a valley at the position AP2. Then, the cam portion 122b from the position AP2 to the position AP3 forms an upward slope, resulting in a peak at the position AP3. After the position AP3, the cam portion 122b forms a downward slope toward the position AP4.

It may be wise at this stage to define the terms used in the foregoing paragraph such as "downward slope" and "upward slope" in terms of the distance from the rotational center 121c to a certain point on the cam profile (cam portion 112). Thus, the term "upward slope" used throughout this description means a decrease of a distance from a point to another point along the cam profile in a direction from the position AP1 to the position AP4. On the other hand, the term "downward slope" used throughout this description means an increase of a distance from a point to another point along the cam profile in the same direction.

A lever 302 is arranged inside the main base frame 11 such that the lever 302 pivotally moves about a pivotal axis 303 in the direction of (+β) and (−β) with a lead end 301 thereof in contact with the curve (slope) of the cam portion 122b. The lead end 301 functions as a cam follower to the cam portion 122b. The opposite end 303 of the lever 302 is in contact with a coil spring 305. The coil spring 305 generates a bias force directing upward in FIG. 6. Thus, rotating the lever 302 in the (−β) direction requires a greater force.

With this arrangement, the gear 122 is given a brake force corresponding to the bias force of the coil spring 305 via the lever 302. Accordingly, a brake force due to the bias force of the coil spring 305 is always given to the gear 122 in this arrangement.

More specifically, as shown in FIG. 6, when the upper frame 12 is in a full open state, the lead end 301 of the lever 302 is abutted against the peak portion of the cam portion 122b corresponding to the position AP1. In order to start closing the upper frame 12, the operator exerts a force necessary to rotate the lever 302 in the (−β)-direction. This force must be great enough to overcome the bias force of the coil spring 305 and to cause the lead end 301 of the lever 302 to slide over the peak portion of the cam portion 122a at the position AP1. In other words, as long as an external force (lock release force) that is greater than the bias force of the coil spring 305 to start closing the upper frame 12 is not exerted on the upper frame 12 at the position AP1, the upper frame 12 maintains its full open state.

To sum it all up, the position AP1 corresponds to the lock position to prevent a rotation (closing) of the upper frame 12 by its own weight. In other words, the cam portion 122b corresponding to the position AP1 (i.e., the peak portion) functions as a lock mechanism.

Then, when the lock release force is given to the upper frame 12 to initiate closing operation of the upper frame 12, the lead end 301 of the lever 302, after sliding over the peak portion at the position AP1, goes on sliding over the slope of the cam portion 122b of the gear 122 in association with a pivotal movement of the gear 122. As the closing operation of the upper frame 12 proceeds, and after the lead end 301 of the lever 302 passes the valley of the cam portion 122b corresponding to the position AP2, the brake force given to the upper frame 12 on the way of closing operation gradually increases for the following reasons.

A distance from the shaft center 121c to the cam portion 122b (only two distances, radius r1 and radius r2, are illustrated in FIG. 6) gradually shortens as the lever 302 slides over the upward slope from the position AP2 toward the position AP3. Accordingly, the coil spring 305, as it is being compressed greater in a physical sense, is gradually given a greater compression force via the lever 302 in response to the shortening of the distance (i.e., radius). As the compression force increases, it in turn results in increase of the brake force exerted on the upper frame 12.

As the closing operation of the upper frame 12 further proceeds, and the lead end 301 of the lever 302 approaches the final stage prior to completion of the closing operation (i.e., position after the position AP3 and before the position AP4), the distance from the shaft center 121c to the cam portion 122b gains because of the downward slope, which in turn results in a decrease of the brake force. That is, the brake force (bias force of the coil spring 305) is weakened at the final stage of closing operation. Thereby, the operator can close the upper unit (upper frame) without giving a needlessly large force.

As mentioned above, according to this embodiment, the cam portion 122b has the cam profile of upward slope for a certain region (i.e., period) corresponding to the position AP2 to the position AP3, that is a certain region (period) within a closing operation of the upper frame 12 from start to end so as to increase the brake force as the closing operation proceeds. Thereby, there can be prevented the phenomenon that the closing speed of the upper frame 12 abruptly increases as the closing operation proceeds. In other words, compared to the case where the image forming apparatus is provided merely with the constant brake force apply mechanism 200, the closing speed of the upper frame 12 can be finely controlled.

In this embodiment, the constant brake force apply mechanism 200 and the variable brake force apply mechanism 300 are used in combination. Accordingly, the brake force exerted on the upper frame 12 is a sum of the brake force given from the constant brake force apply mechanism 200 and that from the variable brake force apply mechanism 300, which becomes a relatively large brake force.

In particular, the above arrangement is effective in the image forming apparatuses of recent models in which the total weight of the upper unit 12 tends to be heavier because heavy parts such as the automatic document feeder unit 30 is mounted on the upper frame 12.

In the foregoing embodiment, the cam portion 122b has partially up and down slopes. However, the cam portion 122b may be configured into any desired form, as long as the brake force increases for at least one region (period) within the period from start to end of the closing operation of the upper frame 12, as the closing operation proceeds.

Figure 7:
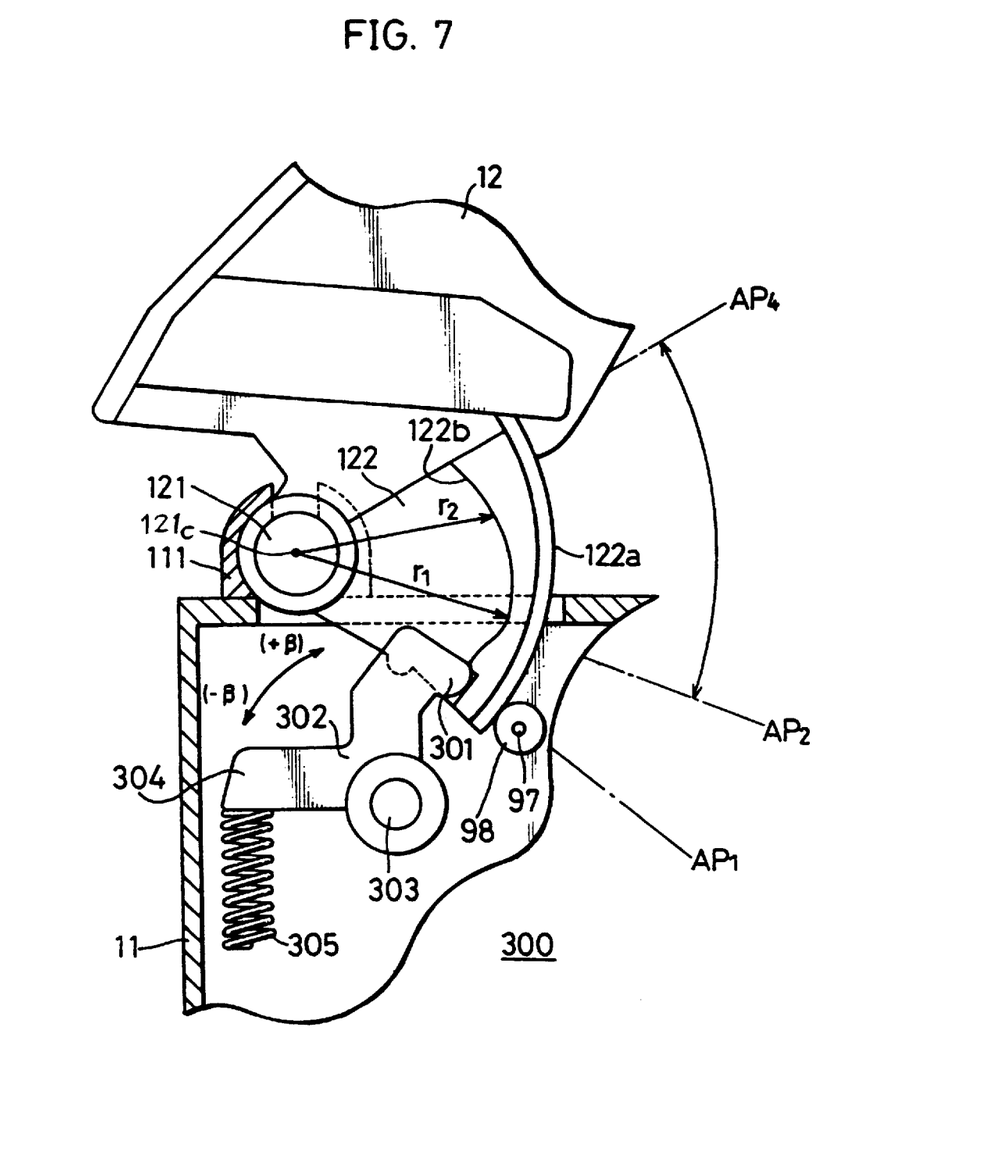
FIG. 7 is a diagram of a modified variable brake force apply mechanism.

For instance, as shown in FIG. 7, the cam portion 122b can take an altered form such that the distance from the shaft center 121c to the cam portion 122b (only two distances, radius r1 and radius r2, are shown in FIG. 7) gradually shortens within the region from the position AP2 to the position AP4, as the lead end 301 of the lever 302 approaches the position AP4.

In this embodiment, the number of variable brake force apply mechanism 300 is not mentioned. At least one variable brake force apply mechanism realizes the open/close mechanism of this invention. For example, the brake force apply mechanism may be provided on one end of the shaft 121, or may be provided on opposite ends of the shaft 121. Further, the position of the brake force apply mechanism is not limited to the above embodiment, and may be set arbitrary.

The variable brake force apply mechanism 300 also functions as a lock mechanism in this embodiment. However, it is not essential for the brake force apply mechanism to have the function as the lock mechanism. The lock mechanism may be provided independently of the variable brake force apply mechanism 300.

Although the present invention has been fully described by way of example with reference to the accompanying drawings, it is to be understood that various changes and modifications will be apparent to those skilled in the art. Therefore, unless otherwise such change and modifications depart from the scope of the invention, they should be construed as being included therein.

What is claimed is:

1. An open/close mechanism for use in an image forming apparatus comprising:

a main base frame;

an upper frame;

the upper frame being rotatably connected to an upper end of the main base frame; and a brake force applying mechanism for applying a brake force to the upper frame during the closing operation thereof, the brake force applying mechanism including:

a variable brake force applying mechanism for increasing the brake force applied to the upper frame in a certain region from start to completion of the closing operation, the variable brake force applying mechanism changing the brake force stepwise in accordance with the proceeding of the closing operation of the upper frame.

2. The open/close mechanism according to claim 1, wherein the variable brake force apply mechanism decreases the brake force immediately before the completion of the closing operation of the upper frame.

3. An open/close mechanism for use in an image forming apparatus comprising:

a main base frame;

an upper frame;

the upper frame being rotatably connected to an upper end of the main base frame; and a brake force applying mechanism for applying a brake force to the upper frame during the closing operation thereof, the brake force applying mechanism including:

a variable brake force applying mechanism for increasing the brake force applied to the upper frame in a certain region from start to completion of the closing operation, the brake force applying mechanism further including a constant brake force applying mechanism for maintaining application of the constant brake force from the start to the completion of the closing operation.

4. An open/close mechanism for use in an image forming apparatus comprising:

a main base frame;

an upper frame;

the upper frame being rotatably connected to an upper end of the main base frame; and a brake force applying mechanism for applying a brake force to the upper frame during the closing operation thereof, the brake force applying mechanism including:

a variable brake force applying mechanism for increasing the brake force applied to the upper frame in a certain region from start to completion of the closing operation, the variable brake force applying mechanism including:

a bias member, a pivotal movement transmitter rotatable about a pivotal axis thereof in association with the rotation of the upper frame and having a cam portion formed around the pivotal axis at a distance from the pivotal axis thereto varied in the certain region, and a lever with one end thereof in contact with the bias member and the opposite end in contact with the cam portion.

5. The open/close mechanism according to claim 4, wherein the distance from the pivotal axis to the contact position of the lever with the cam portion within the certain region decreases in accordance with the proceeding of the closing operation of the upper frame.

6. An image forming apparatus comprising:

a main base frame;

an upper frame rotatably connected to an upper end of the main base frame, and a variable brake force applying mechanism for increasing a brake force applied to the upper frame in a certain region from start to completion of the closing operation, the variable brake force apply mechanism changing the brake force stepwise in accordance with the proceeding of the closing operation of the upper frame.

7. The image forming apparatus according to claim 6, wherein the variable brake force apply mechanism decreases the brake force immediately before the completion of the closing operation of the upper frame.

8. An image forming apparatus comprising:

a main base frame;

an upper frame rotatably connected to an upper end of the main base frame;

a variable brake force applying mechanism for increasing a brake force applied to the upper frame in a certain region from start to completion of the closing operation; and a constant brake force applying mechanism for maintaining application of the constant brake force from the start to the completion of the closing operation.

9. An image forming apparatus comprising:

a main base frame;

an upper frame rotatably connected to an upper end of the main base frame; and a variable brake force applying mechanism for increasing a brake force applied to the upper frame in a certain region from start to completion of the closing operation, the variable brake force applying mechanism including:

a bias member, a pivotal movement transmitter rotatable about a pivotal axis thereof in association with the rotation of the upper frame and having a cam portion formed around the pivotal axis at a distance from the pivotal axis thereto varied in the certain region, and a lever with one end thereof in contact with the bias member and the opposite end in contact with the cam portion.

10. The image forming apparatus according to claim 9, wherein the distance from the pivotal axis to the contact position of the lever with the cam portion within the certain region decreases in accordance with the proceeding of the closing operation of the upper frame.

* * * * *